United States Patent
Guenkova-Luy et al.

(10) Patent No.: US 8,913,998 B2
(45) Date of Patent: Dec. 16, 2014

(54) VIRTUAL COMPOSITE TELEMATIC MODEM

(71) Applicant: Harman Becker Automotive Systems GmbH, Karlsbad (DE)

(72) Inventors: Teodora Guenkova-Luy, Ulm (DE); Oliver Abt, Blaustein (DE); Martin Clauss, Ummendorf (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 13/630,528

(22) Filed: Sep. 28, 2012

(65) Prior Publication Data
US 2013/0084836 A1 Apr. 4, 2013

(30) Foreign Application Priority Data
Sep. 29, 2011 (EP) ..................................... 11007901

(51) Int. Cl.
*H04M 3/42* (2006.01)
*H04L 12/54* (2013.01)

(52) U.S. Cl.
CPC .................................. *H04L 12/5692* (2013.01)
USPC ...................... 455/414.1; 455/418; 455/426.1; 455/403; 455/450; 455/422.1

(58) Field of Classification Search
CPC ........................... H04L 29/08018; H04W 4/02
USPC ......... 455/414.1, 418, 426.1, 403, 450, 422.1
See application file for complete search history.

(56) References Cited

U.S. PATENT DOCUMENTS 6,973,024 B1  12/2005  Joseph et al.
2010/0040209 A1 *  2/2010  Bednarczyk et al. ...... 379/93.01

FOREIGN PATENT DOCUMENTS

EP  0896493  2/1999

* cited by examiner

*Primary Examiner* — Nghi H Ly
(74) *Attorney, Agent, or Firm* — O'Shea Getz P.C.

(57) ABSTRACT

A computer-implemented method for managing data traffic comprises connecting at least two telematic devices to a computer system and managing, by the computer system, a connection of the at least two telematic devices to a communication network for receiving data from the communication network by the at least two telematic devices. The method runs at least one telematic application on the computer system or on at least one of the at least two telematic devices based on the data received from the communication network. The computer system controls the at least two telematic devices such that both of the at least two telematic devices receive the data for the at least one telematic application from the communication network at the same time or one of the at least two telematic devices receives the data from the communication network at a first time period whereas the other one of the at least two telematic devices receives the data from the communication network at a second time period different from the first time period.

15 Claims, 2 Drawing Sheets

VIRTUAL COMPOSITE TELEMATIC MODEM

CLAIM OF PRIORITY

This patent application claims priority from EP Application No. 11 007 901.9 filed Sep. 29, 2011, which is hereby incorporated by reference.

FIELD OF TECHNOLOGY

The present invention relates to telematic systems, in particular, automotive telematic systems, wherein a plurality of telematic devices are provided for transferring media (e.g., data, voice, etc.) to and from a communication network.

RELATED ART

Telecommunication, mobile services are ubiquitously available in various environments. The general application of such services is referred to as telematics, which means the integrated application of telecommunications and informatics, whereby technologies for sending, receiving and storing information via telecommunication devices are put into operation for realization, for example, of home and business applications. For example, in the automotive environment vehicular infotainment and telematics are offered via multiple devices both installed in the vehicle and mobile devices carried by a user and possibly connected to a vehicle communication system, for instance terminal devices like Personal Digital Assistants and mobile phones.

Considering the fact that the communication infrastructure develops more slowly compared to the user terminal devices, in general the mobile user-applications are constrained to operate under conditions of a less powerful network generation, e.g., a 4G ($4^{th}$ generation) telematic device like LTE (Long-Term Evolution) may be forced to connect to 3G UMTS ($3^{rd}$ generation—Universal Mobile Telecommunications System) or even 2G GSM ($2^{nd}$ generation—Global System for Mobile Communications) base-stations due to unavailability of better infrastructure technology at the area of the device-attachment. This results in lesser performance or even disability to operate for the mobile user-applications.

In the context of the use of telematic services it should be made possible to transmit and receive both packet-based data, for example, Internet Protocol (IP) data, and voice. However, current mobile networks cannot always support packet data and voice simultaneously over the same end-customer device. Moreover, some networks or end-customer devices are limited to only IP-centric solutions for packet-data only. Especially in mobile networks the effective communication bandwidth and network accessibility often pose problems in the form of data delay or even interruptions of the data streams and connections on a single device.

There is a need for improved connectivity and bandwidth capacity of telematic applications when a user makes use of a variety of telematic devices. It is also desirable for more efficient use of telematic services including both packet-based data transfer and voice transmission and reception.

SUMMARY OF THE INVENTION

A computer-implemented method for managing data traffic comprises connecting at least two telematic devices to a computer system; managing by the computer system connection of the at least two telematic devices to a communication network for receiving data from the communication network by the at least two telematic devices; and running at least one telematic application on the computer system or on at least one of the at least two telematic devices based on the data received from the communication network, wherein the computer system controls the at least two telematic devices such that both of the at least two telematic devices receive the data for the at least one telematic application from the communication network at the same time or one of the at least two telematic devices receives the data from the communication network at a first time period whereas the other one of the at least two telematic devices receives the data from the communication network at a second time period different from the first time period.

Data transfer between the at least two telematic devices and the communication network can be established such that the telematic devices receive data from the communication network and transfer data to the communication network. Connection of the at least two telematic devices to a communication network, which can be heterogeneous due to the technology of attachment of the devices, is managed by the computer.

The connectivity capabilities of the at least two telematic devices are coupled and presented as one virtual device to the application(s). From the viewpoint of telematic applications running on the telematic devices one single (combined) connectivity channel to the communication network is provided. The bundling functionality of the combined connectivity capabilities of the at least two telematic devices can, in principle, be realized in any computer provided for a particular execution environment. The computer may relay the data received from the communication network over the telematic devices to the respective end-applications that are the data users and vice versa.

By the inventive computer-implemented method a virtual composite telematic modem for controlling a variety of telematic devices connected with a communication network is generated. The virtual composite telematic modem hides the underlying particular technologies of the devices from the telematic applications running on the computer system that is the holder of the virtual telematic device method. For example, the virtual composite telematic modem presents to the telematic applications an IP connection for data and GSM-Voice for voice, respectively.

The telematic applications are thus in a position to apply an interface that abstracts from the individual telematic devices and requests data or voice connections with the communication network. The virtual composite telematic modem may apply protocols for data transfer on different levels of abstraction to present to the telematic applications a single connectivity channel for whatever purposes.

The communication network may comprise any wide-area network like the Universal Mobile Telecommunications System (UMTS) network and/or a Global System for Mobile (GSM) Communications network, et cetera. In particular, the telematic devices may be connected to the Internet under the control of the computer wherein the computer-implemented method of the virtual telematic device is implemented in.

The computer-implemented method may be implemented in a computer installed in a vehicle, for example, an automobile. In this case, the computer is part of an in-vehicle communication system. The automobile computer enables the possibility to connect multiple telematic user devices which can be applied as a single modem from the point of view of the applications in the car. This increases the effective bandwidth for the applications running their data over the telematic devices and guaranteeing voice and packet-based (non-voice) data parallelism for applications associated with data and/or voice contents. In particular, the bundling of the connectivity capabilities of the telematic devices may serve the requirements of multiple users utilizing the same car computer system.

Another example of home and/or business application of the computer implemented method is considered any case of sharing of personal communication devices in form of a pool controlled via the virtual composite device, whereby the so controlled pool of devices provides better perceivable performance for all applications and their users. In such case the virtual modem is implemented in a computer which performs for example as a router for other home or business stationary or mobile computers.

The overall connectivity performance of the telematic applications is significantly improved by increasing the individual media-transfer bandwidths of each of the telematic applications for data and voice media by bundling the connectivity capabilities of the multiple telematic devices that transfer the media on behalf of the applications. Compared with single device UMTS (or other network technology) the bundled telematic devices obtain higher guarantee for parallel data and voice media without interruption of data flows.

The application of multiple devices increases the overall data throughput of the system by using application and device prioritization at transport protocol level based on different underlying connectivity technologies. The application of the composite virtual modem is applicable in high-mobility, wide-area networks due to their capability to automatically reconfigure based on the environmental conditions. In addition, the provided resource-redundancy by coupling of multiple telematic devices enables the optimal decision within the composite modem when to use which one of the involved telematic devices for what media, thereby optimizing the overall network connectivity and the perceivable performance of the end-user telematic applications.

According to an embodiment the computer not only controls which one of the multiple telematic devices connects to and uses the communication network but also reacts to changes of the connection from the communication network of at least one of the at least two telematic devices, for example in cases of network signal changes, handovers or re-attachments to the infrastructure. For example, the computer is part of an automotive communication system installed in an automobile. During the travel of the automobile it may happen that a high quality WLAN network becomes available (due to some WLAN hotspot, for instance). In such a case, the computer may switch connection of at least one of the telematic devices from a UMTS network, for example, to the WLAN network. Thus, both signal quality of the individual telematic devices and communication network quality of different available communication networks can be taken into account when controlling the transfer of data between the communication network and the telematic devices.

According to an example of the method for managing data traffic one of the at least two telematic devices transfers packet-based (e.g., non-voice) data to the communication network (receives data from the communication network) whereas another one of the at least two telematic devices transfers voice data to the communication network (receives data from the communication network). Both kinds of data can be transferred in parallel. Since two telematic devices (or even more) participate at the process of data transfer it can be achieved that a particular one of the telematic devices that is particularly suitable for the transfer of packet-based data is used for the transfer of that kind of data, whereas another one of the telematic devices that is particularly suitable for the transfer of voice data is selected for the transfer of that kind of data from the communication network.

Typical examples for telematic devices that can be controlled by running the above examples of the computer-implemented method on a computer include a mobile phone, a Personal Digital Assistant, a mobile computer, USB-UMTS stick (Universal Serial Bus component with integrated UMTS modem), etc. (see also detailed discussion below).

According to another example, a method comprises the steps of transferring voice data by a first telematic device to/from the communication network; transferring packet-based data by a second telematic device to/from the communication network; and running an application based on both the packet-based data and the voice data on any computer utilizing the coupling functionality of the virtual telematic modem as abstraction of the actual physical devices.

Moreover, this example may also comprise changing connection of the first or the second telematic device from the communication network due to network signal changes of the network radio paths or handovers between physical sub-networks. The method comprises monitoring for availability of new communication networks during movement of the computer system wherein the computer-implemented method is implemented in. Wherever it is determined that a change of the network configuration on one or more devices may provide higher quality of data transfer, for example, in terms of the available bandwidth, it can be decided to switch connection of one or more of the telematic devices to another available telematic device in the system.

In one embodiment, a computer-implemented method for managing data traffic is implemented in a computer of an automotive communication system. A mobile phone and a mobile computer are connected to the computer of the automotive system. The mobile phone is configured for UMTS connection whereas the mobile computer is configured for WLAN connection. Both devices may be connected to the computer of the automotive system via suitable short-range mobile technology (e.g., Bluetooth or WLAN in ad-hoc point-to-point mode, or fix connection like USB). The automotive computer checks availability of communication networks. It may be the case that a UMTS network is available whereas WLAN is not.

The automotive computer controls connection of the mobile phone to the UMTS network and the user makes the call. Any Internet data has to share in such case bandwidth with the voice call or is simply impossible as the underlying network does not support this (for example, in 2G GSM base-stations). During the travel of the vehicle wherein the automotive system is installed a WLAN hotspot is arrived and the vehicle parks in the range of the WLAN network. In such a situation the automotive computer may decide to switch the data channel to the mobile computer to use WLAN network in order to receive Internet data desired by the user of the automotive computer since WLAN has higher throughput capacity. The combined connectivity capabilities of the mobile phone and the mobile computer can, thus, be used to eventually supply both voice data and Internet data to the automotive computer at higher quality for both media.

According to another aspect, a communication system comprises a computer system (that includes a computer) configured for (i) connecting to at least two telematic devices; (ii) managing connection of the at least two telematic devices to a communication network for transmitting data to the communication network by the at least two telematic devices and/or receiving data from the communication network by the at least two telematic devices; (iii) implementing a virtual composite modem that controls the at least two telematic devices such that both of the at least two telematic devices exchange the data for a telematic application with the communication network at the same time or one of the at least two telematic devices exchanges the data with the communication network at a first time period whereas the other one of the at least two telematic devices exchanges the data with the communication network at a second time period different from the first time period; and (iv) allowing at least one of the at least two telematic devices or any other computer within the computer system to run a telematic application based on the data exchanged with the communication network.

The computer system may comprise a computer configured for (i) connecting to at least two telematic devices (for example, a mobile phone and a mobile computer or a mobile phone and a USB-UMTS stick); (ii) managing connection of the at least two telematic devices to a communication network for exchanging data with the network by the at least two telematic devices; (iii) controlling the at least two telematic devices such that both of the at least two telematic devices exchange the data for a telematic application with the communication network at the same time or one of the at least two telematic devices exchanges the data with the communication network at a first time period whereas the other one of the at least two telematic devices exchanges the data with the network at a second time period different from the first time period; and (iv) allowing that any telematic application running on abstraction of the physical devices provided by the virtual composite modem can exchange data with the communication network.

By exchanging data it is meant transferring data to the communication network and/or receiving data from the communication network.

According to an example, in the communication system a computer (e.g., of the computer system) executing the virtual composite modem is configured to change the connection of the at least one of the two telematic devices based on a quality of signal and bandwidth of the specific network technology of attachment from the communication network or change the connection between any of the telematic devices and the communication network based on monitoring of the connection quality.

The computer executing the virtual composite modem may, furthermore, be configured to control one of the telematic devices to exchange packet-based data with the communication network (e.g., transfer packet-based data to and/or receive packet-based data from the communication network) and another one of the telematic devices to exchange voice data with the communication network (e.g., transfer packet-based data to and/or receive voice data from the communication network).

One of the at least two telematic devices can be a mobile phone, or mobile computer, or any mobile user equipment like USB stick.

According to another aspect, the computer system may be configured to invoke (i) transferring voice data by a first telematic device from the communication network; (ii) transferring packet-based data by a second telematic device from the communication network; and (iii) running an application based on both the packet-based data and the voice data on any computer utilizing the coupling functionality of the virtual telematic modem as abstraction of the actual physical devices.

The computer system may comprise for example a computer that is a general purpose computer that follows instructions. All kind of computers from micro to mainframe can be used depending on the specific use-case and execution environment. The computer may also be configured to change the connection of the at least two telematic devices based on a quality of network signal or the network technology of the controlled telematic devices. Particularly, the computer may cause transfer of packet-based data using the network of attachment of the one of the telematic devices and transfer of voice data using the network of attachment of the other one of the telematic devices.

These and other objects, features and advantages of the present invention will become apparent in light of the detailed description of the best mode embodiment thereof, as illustrated in the accompanying drawings. In the figures, like reference numerals designate corresponding parts.

DESCRIPTION OF THE DRAWINGS

Additional features and advantages of the present invention will be described with reference to the drawings. In the description, reference is made to the accompanying figures that are meant to illustrate preferred embodiments of the invention. It is understood that such embodiments do not represent the full scope of the invention.

DETAILED DESCRIPTION OF THE INVENTION

Figure 1:
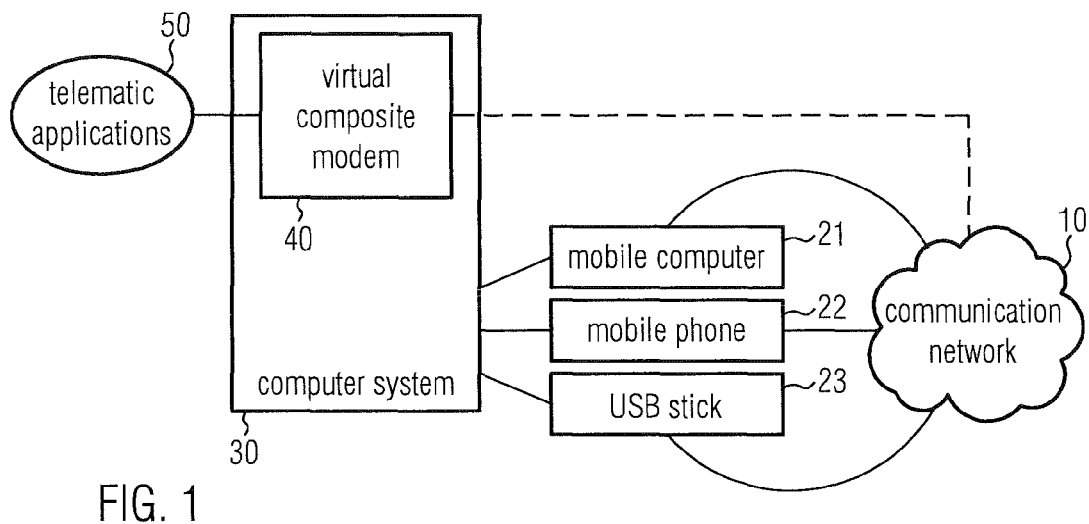
FIG. 1 illustrates the operation of a virtual composite modem in accordance with an example of the present invention.

An example for the inventive combined access of multiple telematic devices to a communication network 10 is shown in FIG. 1. The communication network 10 may be any wireless high-mobility wide-area network or combination of such wireless networks. The communication network 10 may comprise of but is not limited to technologies such as Wireless Local Area Network (WLAN) and/or a General Packet Radios Service (GPRS) network and/or a Global System for Mobile Communications (GSM) network and/or a Universal Mobile Telecommunications System (UMTS) and/or Long-Term-Evolution (LTE) network. All mentioned above technologies belong to IEEE (Institute of Electrical and Electronics Engineers) or 3GPP (3rd Generation Partnership Project). The inventive method is not considered to be an enhancement of the mentioned technologies, but just uses these technologies or any similar technologies in a novel way.

The data exchanged via the communication network 10 can be, in general, IP-data that can be static data like text, or dynamic like voice, video, etc. or any digitally coded data like GSM-voice or SMS-text, depending on the used coding and protocols for these information types.

In the shown example, a mobile computer (notebook) 21, a mobile phone 22, and a USB-UMTS stick 23 are provided as mobile telematic devices, which may connect the devices 21, 22 and 23 to the communication network 10. For example, the USB stick 23 can be configured to connect to a UMTS network of the communication network 10. The mobile phone 22 can also be configured to connect to the UMTS network of the communication network 10. The mobile computer 21 can be configured to connect to a WLAN network of the communication network 10.

The mobile computer 21, the mobile phone 22 and the USB stick 23, in the present example, are connected to a computer system 30 that comprises a CPU and a memory as well as some interfaces. The computer system 30 may be any in-vehicular (i.e. car, train, plain, etc.) computer system, a stationary or mobile home or business computer system. In the embodiment that the computer system 30 is installed in a vehicle, it represents a key unit of a vehicle communication system, for instance, an automotive communication system. The mobile computer 21 and the mobile phone 22 may be connected via Bluetooth or WLAN with the computer system 30 while the USB stick is connected via its USB connector to a USB port of the computer system 30.

In the computer system 30 implements a method for managing media traffic. This computer-implemented method provides a virtual composite modem 40 for accessing the communication network 10. Actually, the virtual composite modem 40 is not a physical device, but rather a data transmission / reception function managed by the computer system 30 and resulting from the combination of the mobile computer 21, the mobile phone 22 and the USB stick 23, i.e., the technologies and properties of accessing the communication network 10 by the devices 21, 22 and 23 are bundled for an improved media transfer.

Telematic applications 50 can be carried out by the virtual composite modem 40, i.e., the necessary media transfer between the telematic applications 50 and the communication network 10 is performed by the bundled media transfer capacities of the mobile computer 21, the mobile phone 22 and the USB stick 23.

As already mentioned the computer system 30 can be part of an in-vehicle (automotive) communication system. The computer system can generate a virtual composite telematic modem 40 thereby coupling the mechanisms for vehicle external data connectivity in order to represent them to the telematic applications in the vehicle as a single connectivity channel. In general, the bundling functionality of the virtual composite telematic modem 40 can be implemented in any computer related to the specific execution environment.

The virtual composite telematic modem 40 hides the underlying technologies from the telematic applications and presents to them for example only the IP-connection for packet-based data or the GSM-voice for voice. That is, the virtual composite modem 40 represents the multiple physical telematic devices as a single virtual device to the telematic applications running on the devices. The applications are thus in position to apply an interface abstracting the actual devices and applying methods for just requesting data or voice connections.

The composite telematic modem 40 may apply protocols on different levels of abstraction to represent to the applications a single connectivity channel for whatever purposes. The telematic devices may experience connectivity interruptions due to the mobility of the vehicle. In the case of an interruption of the data flow between a telematic device and the communication network 10, the composite telematic modem 40 is in a position to recognize automatically such situations and reconfigure itself so that only the physically available devices and connectivity channels are usable to the telematic applications under question.

The virtual combined telematic modem 40 provides an improved data and voice parallelism as compared with known systems. For example, a UMTS base station will allow the communication of two telematic devices in parallel irrespectively of its current load, whereas parallel data-voice execution on one device might not work due to base station load. Without the inventive parallel data—voice capability (connectivity) of an attached 2G GSM base station a single physical device is forced to sequential execute data and voice.

In the example of a the virtual composite telematic modem 40 illustrated in FIG. 1, the USB-UMTS stick 23 and the Bluetooth coupled mobile phone 22 are provided for realization of an external connection whereby voice over the Bluetooth coupled mobile phone and data over the USB-coupled UMTS modem has higher parallel execution guarantee for the same base station as compared to a mobile telephone alone. Attachment of the bundled devices to different base stations (e.g. of different providers or due to the power of the mobile system signal) are also encompassed in this example. Thus the accessibility can be also increased or better load-distribution due to the attachment to different available access-nodes of the single bundled devices can be achieved.

Moreover, the inventive method results in a higher effective bandwidth and thus higher Service Quality for the end-user applications irrespectively if the application itself is best-effort or Quality of Service (QoS) aware as the virtual composite modem can control the media access of the applications based on the transfer capabilities of the attached devices and the transfer load requirements of the applications. The virtual composite modem is thus also in position to integrate and use existing techniques for QoS management of single media types like priority management or packet filtering. However, the QoS-relevant data-scheduling occurs over all bundled devices and it is not based on single point-to-point communication per media or application.

Quality of Service can be applied as a first optimization step within the system on the level of selection of devices based on the network signal strength with respect to the selection which device shall be taken for certain media services. More critical applications are associated with devices having the better network signal. Furthermore, in the case of a UMTS-capable base station with parallel data and voice, the combination of the Bluetooth coupled mobile phone 22 and the coupled USB UMTS stick 23 leads effectively to two data channels, which can be applied also to place voice connection on the Bluetooth phone and the data on the USB UMTS stick. This decouples the media in order to avoid mutual disturbances compared with the case that both media are on the same device (e.g., the Bluetooth phone) or during already existing voice. All new data connections can be shifted to the USB stick thereby preserving better bandwidth for the voice connection on the Bluetooth phone.

Provision of the mobile computer 21 enables data transfer via a third data channel that can be used in addition to or alternatively for the USB stick 23, for instance. For example, when voice is transmitted via the communication network 10, a voice capable device (e.g., mobile phone 22) can be used for the reception of the voice data, whereas the data-capable devices (e.g., USB-UMTS stick 23 and the mobile computer 21) are used for the packet-based data. Furthermore, due to changes of the networks (of attachment) and by considering service priorities (e.g., QoS priorities for the IP-packets of the applications), higher priority application may be scheduled to the higher bandwidth data-channel of the mobile computer 21 with WLAN technology, whereas low priority applications may remain on the USB-UMTS stick 23. This use-case can be further generalized so that more than two devices are used. In such case, however, it might be considered necessary that the user or the provider of the devices defines an order of application of the devices so that the virtual composite modem 40 is informed what order to select the devices with respect to network accessibility probability or costs for transferring of the information.

For the purpose of this solution, where the virtual composite modem 40 operates as an abstraction on IP-level, a possible technology for the configuration of the modem 40 is the Mobile-IP Concept. In this case multiple care-of addresses of the devices are hidden behind a single home IP-address or the target device where the telematic applications operate. For example, the home address is the address of the target computer executing the virtual composite modem within the computer system 30 abstracting the temporary care-of addresses of the attached mobile telematic devices 21, 22 and 23.

Furthermore, the mobile composite telematic modem 40 may operate as a Gateway on different protocol levels thus being able to map heterogeneous media-transfer to/from the single telematic devices 21, 22 and 23 in a generalized way for the target applications operating on the abstraction of the composite modem 40.

The inventive virtual composite telematic modem 40 can automatically reconfigure itself based on the current connectivity capabilities of the coupled underlying devices, thus providing seamless and continuous application of the connectivity channel for the telematic services regardless of changes within the underlying devices. This feature is applicable as long as the connectivity disruptions are not critical from the application point of view, as time critical and session aware applications might not cope with the short interruptions needed for the recognition of the system state and the re-configuration of the modem. Particular examples of such usage scenarios are:

a) Changes of the network-signal strength of the different devices, whereby more critical applications are shifted to devices having better quality of the network signal. This solution may apply concepts of the Mobile Ad Hoc Network (MANET) protocol family to increase its efficiency, e.g., by exchanging information with the fix or ad-hoc network infrastructure concerning accessibility probability and network load for the purpose of re-calculation of the association of the media with the coupled devices. The MANET architecture and protocols are standardization efforts of the Internet Engineering Task Force (IETF).

b) If a mobile phone 22 applies Advanced Audio Distribution Profile (A2DP) to play music over the Bluetooth internal connectivity channel, the BT-connectivity for IP-data for external connections to the Internet is decreased or simply not available. Considering the execution circumstances of the BT-Phone, the composite modem 40 may temporarily disable this device for telematic usage and transfer data-streams over other available devices (for example, the mobile computer 21) and connectivity channels.

c) In the case that a WLAN device reports possible external connectivity to the Internet, the virtual composite telematic modem 40 may reconfigure the IP-channel to this device due to the higher bandwidth of this technology compared with attached in parallel GSM or UMTS mobile devices.

d) Known provider/user restrictions to use certain device for certain media and dynamic changes of these configurations may also lead to an automatic dynamic reconfiguration of the modem 40 considering the necessity that the user provides the order of application of its devices and considering also cost issues.

Consequently, the virtual composite telematic modem 40 is in a position to always apply the available devices (for example, the mobile computer 21, the mobile phone 22 and the USB stick 23 of FIG. 1) in an optimal way depending on their capabilities and/or limitations.

Figure 2:
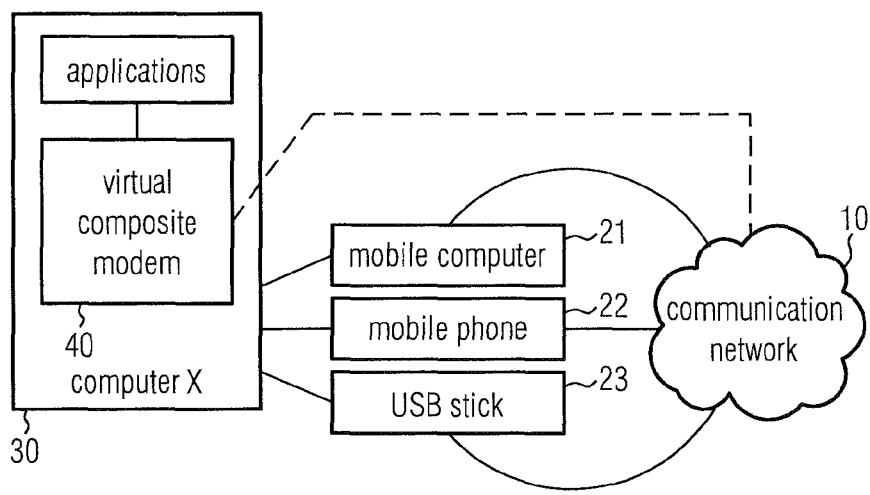
FIG. 2 illustrates an embodiment of the present application wherein application and a virtual composite model are implemented as software units on the same computer.
Figure 3:
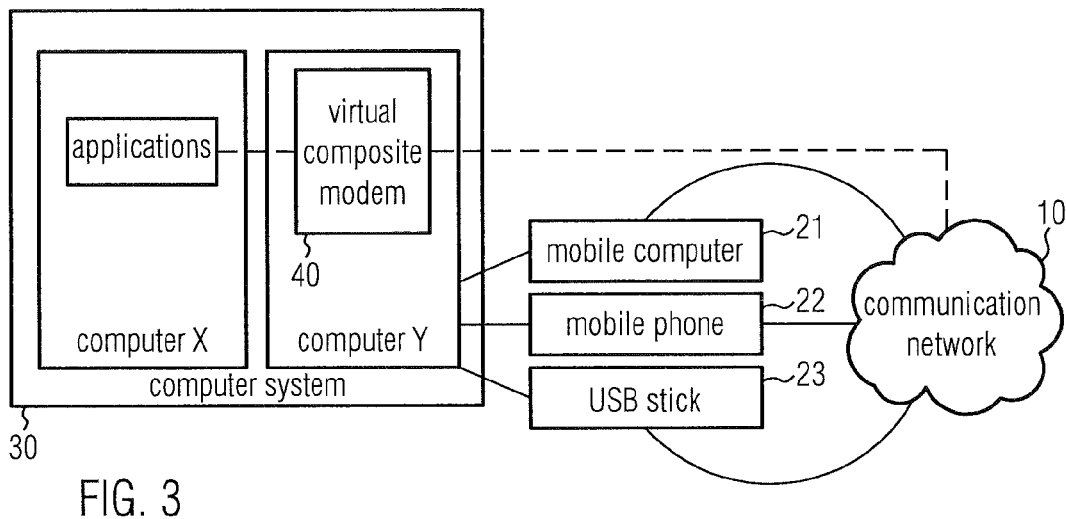
FIG. 3 illustrates an embodiment of the present application wherein application and a virtual composite model are implemented as software units on different computers.
Figure 4:
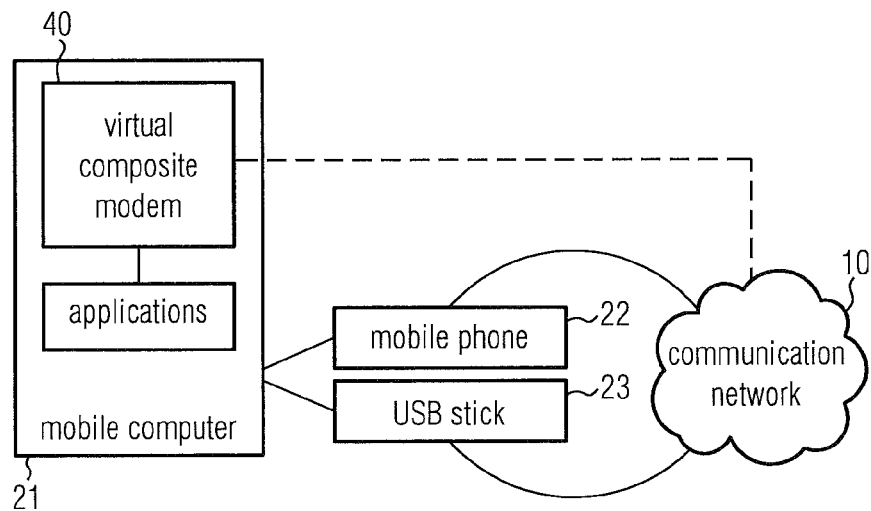
FIG. 4 illustrates an embodiment of the present application wherein application and a virtual composite model are implemented as software units on a mobile computer.

In FIGS. 2 to 4 particular ways of realizing of the present invention are illustrated. As shown in FIG. 2 both the telematic applications and the virtual composite telematic modem 40 can be implemented as executable software instructions in the very same computer X of a computer system 30. This embodiment is particularly appropriate for an in-vehicle solution. As in the example shown in FIG. 1 a mobile computer (notebook) 21, a mobile phone 22, and a USB-UMTS stick 23 are provided as mobile telematic devices that are connected to the computer X.

Alternatively, and as it is shown in FIG. 3, the telematic application(s) may be run on a first computer X of the computer system 30, and the virtual composite telematic modem 40 can be run on a second computer Y of the computer system 30.

According to a further example, the mobile computer 21 shown in FIG. 1 can be used as the execution device for both running the telematic application(s) and the telematic communication with the communication network 10.

All previously discussed embodiments are not intended as limitations but serve as examples illustrating features and advantages of the invention. It is to be understood that some or all of the above described features can also be combined in different ways.

Although the present invention has been illustrated and described with respect to several preferred embodiments thereof, various changes, omissions and additions to the form and detail thereof, may be made therein, without departing from the spirit and scope of the invention.

What is claimed is:

1. A computer-implemented method for managing data traffic, comprising the steps of:
   connecting at least two telematic devices to a computer system;
   managing by the computer system, connection of the at least two telematic devices to a communication network, for receiving data from the communication network by the at least two telematic devices; and
   running at least one telematic application on the computer system or on at least one of the at least two telematic devices based on the data received from the communication network, wherein
   the computer system automatically controls based on environmental conditions the at least two telematic devices such that both of the at least two telematic devices receives the data for the at least one telematic application from the communication network at the same time or one of the at least two telematic devices receives the data from the communication network at a first time period whereas the other one of the at least two telematic devices receives the data from the communication network at a second time period different from the first time period.

2. The method according to claim 1, wherein the computer system changes connection from at least one of the at least two telematic devices to the communication network to another one of the at least two telematic devices to the communication network by a virtual composite modem that is realized by the computer system.

3. The method according to claim 2, wherein the change of connection is based on quality of signal and bandwidth of the specific network technology of attachment from the communication network by the at least one of the at least two telematic devices.

4. The method according to claim 1, wherein one of the at least two telematic devices receives packet-based data from the communication network whereas another one of the at least two telematic devices receives voice data from the communication network.

5. The method according to claim 1, wherein at least one of the at least two telematic devices transmits data to the communication network.

6. The method according to claim 5, wherein the data transmitted to the communication network comprises packet-based data and voice data.

7. The method according to claim 4, wherein one of the at least two telematic devices is a mobile phone, USB-UMTS device, or mobile computer, or any mobile end-user equipment supporting attachment to wireless communication network.

8. The method according to claim 7, wherein connection of the at least two telematic devices to the communication network is realized by a virtual composite modem is part of a communication system installed in either of
   a) an automobile;
   b) one of a home or business environment, in particular, in a hardware modem controller or a mobile personal device, in particular, a laptop or a stationary personal device, in particular, a personal computer.

9. The method according to claim 1, comprising the steps of:
   transmitting voice data by a first telematic device from the communication network;
   transmitting packet-based data by a second telematic device from the communication network; and
   running an application based on both the packet-based data and the voice data on one of any of the telematic devices or device within the computer system.

10. The method according to claim 9, further comprising changing connection of the first or second telematic device from the communication network to another telematic device due to coupling of this additional device with the computer system and/or due to occurrence of new network technology of attachment within the range of the computer system where the telematic devices execute.

11. Communication system, comprising:
   a computer system that connects to at least two telematic devices, and manages connection of the at least two telematic devices to a communication network for transmitting data to the communication network by the at least two telematic devices and/or receiving data from the communication network by the at least two telematic devices;
   wherein the computer system implements a virtual composite modem that automatically controls based on environmental conditions the at least two telematic devices such that both of the at least two telematic devices exchange the data for a telematic application with the communication network at the same time or one of the at least two telematic devices exchanges the data with the communication network at a first time period whereas the other one of the at least two telematic devices exchanges the data with the communication network at a second time period different from the first time period, wherein the computer system allows at least one of the at least two telematic devices or any other computer within the computer system runs a telematic application based on the data exchanged with the communication network.

12. The communication system according to claim 11, wherein a computer executing the virtual composite modem is configured to change the connection of the at least one of the two telematic devices based on a quality of signal and bandwidth of the specific network technology of attachment from the communication network or change the connection between any of the telematic devices and the communication network based on monitoring of the connection quality.

13. The communication system according to claim 11, wherein a computer executing the virtual composite modem is configured to control one of the telematic devices to exchange packet-based data with the communication network and another one of the telematic devices to exchange voice data with the communication network.

14. The communication system according to claim 11, wherein one of the at least two telematic devices is a mobile phone, or mobile computer, or any mobile user equipment like USB stick.

15. The communication system according to claim 11, wherein the computer executing the virtual composite modem is configured to invoke
   exchanging voice data between a first telematic device and the communication network;
   exchanging packet-based data between a second telematic device and the communication network; and
   serving an application based on both the packet-based data and the voice data which can run on any of the telematic device or any other computer within the computer system, or on the computer executing the virtual composite modem itself.

* * * * *